(12) United States Patent
Barbour et al.

(10) Patent No.: US 7,099,519 B2
(45) Date of Patent: Aug. 29, 2006

(54) METHOD AND SYSTEM FOR ENHANCING SOLUTIONS TO A SYSTEM OF LINEAR EQUATIONS

(75) Inventors: Randall L. Barbour, Glen Head, NY (US); Harry L. Graber, Brooklyn, NY (US); Yaling Pei, Morris Plains, NJ (US)

(73) Assignee: The Research Foundation of State University of New York, Albany, NY (US)

( * ) Notice: Subject to any disclaimer, the term of this patent is extended or adjusted under 35 U.S.C. 154(b) by 8 days.

(21) Appl. No.: 10/485,841

(22) PCT Filed: Aug. 2, 2002

(86) PCT No.: PCT/US02/24520

§ 371 (c)(1),
(2), (4) Date: Sep. 30, 2004

(87) PCT Pub. No.: WO03/012736

PCT Pub. Date: Feb. 13, 2003

(65) Prior Publication Data

US 2005/0041882 A1    Feb. 24, 2005

Related U.S. Application Data

(60) Provisional application No. 60/309,572, filed on Aug. 2, 2001.

(51) Int. Cl.
*G06K 9/40* (2006.01)
(52) U.S. Cl. .................................. 382/260; 382/276
(58) Field of Classification Search ........ 382/260–269, 382/276–282
See application file for complete search history.

(56) References Cited

U.S. PATENT DOCUMENTS

| 5,764,307 A | 6/1998 | Ozcelik et al. |
| 5,802,218 A | 9/1998 | Brailean |

FOREIGN PATENT DOCUMENTS

| GB | 2084743 A | 4/1982 |

*Primary Examiner*—Thomas D. Lee
*Assistant Examiner*—Stephen Brinich
(74) *Attorney, Agent, or Firm*—Scully, Scott, Murphy & Presser, P.C.

(57) ABSTRACT

A method of significantly improving the quality of solutions to a system of linear equations. The solution to a system of linear equations is enhanced by: (1) modeling a target medium into a plurality of elements and imposing at least one localized fluctuation into the target medium; (2) measuring an output resulting from at least one localized fluctuation; and (3) processing the measured output to reconstruct a result, determining a correction filter, and applying the correction filter to the result.

20 Claims, 4 Drawing Sheets

METHOD AND SYSTEM FOR ENHANCING SOLUTIONS TO A SYSTEM OF LINEAR EQUATIONS

This application claims the benefit under 35 U.S.C. § 120 of prior U.S. Provisional Patent Application Ser. No. 60/309,572 filed Aug. 2, 2001, entitled "A METHOD FOR FREQUENCY ENCODED SPATIAL FILTERING TO ENHANCE IMAGING QUALITY OF SCATTERING MEDIA."

This invention was made with U.S. Government support under NIH grant number RO1-CA66184. The U.S. Government has certain rights in the invention.

FIELD OF THE INVENTION

This invention relates to the field of linear equations, and more particularly to using correction filters to enhance solutions to a system of linear equations such as the type of equations used in imaging of a scattering medium.

BACKGROUND

Imaging of a scattering medium relates generally to a modality for generating an image of the spatial distribution of properties (such as the absorption or scattering coefficients) inside a scattering medium through the introduction of energy into the medium and the detection of the scattered energy emerging from the medium. Systems and methods of this type are in contrast to projection imaging systems, such as x-ray. X-ray systems, for example, measure and image the attenuation or absorption of energy traveling a straight line path between the x-ray energy source and a detector, and not scattered energy. Whether energy is primarily highly scattered or primarily travels a straight line path is a function of the wavelength of the energy and medium it is traveling through.

Imaging based on scattering techniques permits the use of new energy wavelengths for imaging features of the human body, earth strata, atmosphere and the like that can not be imaged using projection techniques and wavelengths. For example, x-ray projection techniques may be adept at imaging bone structure and other dense objects, but are relatively ineffective at distinguishing and imaging blood oxygenation levels. This is because the absorption coefficient of blood does not vary significantly with blood oxygenation, at x-ray wavelengths. However, infrared energy can identify the spatial variations in blood volume and blood oxygenation levels because the absorption coefficient at these wavelengths is a function of hemoglobin states. Other structures and functions can be identified by variations or changes in the scattering coefficient of tissue exposed to infrared energy, such as muscle tissue during contraction, and nerves during activation. These structures could not be imaged by projection techniques because projection techniques are not effective in measuring variations in scattering coefficients. These measures, obtainable through imaging based on scattering techniques, such as optical tomography, have considerable potential value in diagnosing a broad range of disease processes.

A typical system for imaging based on scattered energy measures, includes at least one energy source for illuminating the medium and at least one detector for detecting emerging energy. The energy source is selected so that it is highly scattering in the medium to be imaged. The source directs the energy into the target scattering medium and the detectors on the surface of the medium measure the scattered energy as it exits. Based on these measurements, a reconstructed image of the internal properties of the medium is generated.

The reconstruction is typically carried out using "perturbation methods." These methods essentially compare the measurements obtained from the target scattering medium to a known reference scattering medium. The reference medium may be a physical or a fictitious medium which is selected so that it has properties that areas close as possible to those of the medium to be imaged. Selecting a reference medium is essentially an initial guess of the properties of the target. In the first step of reconstruction, a "forward model" is used to predict what the detector readings would be for a particular source location based on the known internal properties of the reference medium. The forward model is based on the transport equation or its approximation, the diffusion equation, which describes the propagation of photons through a scattering medium. Next, a perturbation formulation of the transport equation is used to relate (1) the difference between the measured and predicted detector readings from the target and reference, respectively, to (2) a difference between the unknown and known internal properties of the target and reference, respectively. This relationship is solved for the unknown scattering and absorption properties of the target. The final distributions of internal properties are then displayed or printed as an image.

Imaging systems and methods based on scattering techniques, such as optical tomography systems, provide a means with which to examine and image the internal properties of scattering media, such as the absorption and diffusion or scattering coefficients. However, the aforementioned imaging systems and methods that recover, contrast features of dense scattering media have thus far produced results having at best modest spatial resolution. Strategies for improving image quality are known (e.g., Newton type), but invariably these are computationally intensive and can be quite sensitive to initial starting conditions.

Central to the method of image formation in magnetic resonance imaging (MRI) is that there is a one-to-one correspondence between the frequency of the measured induced current and the spatial orientation of the magnetic field gradient. Because the spatial orientation of the magnetic field gradient is known, this correspondence permits a direct assignment of a measured response to the origin of the signal in space. In effect, the physics of the magnetic resonance phenomenon encodes a frequency signature into the measured data that has a known spatial relationship with the target medium. More generally speaking, methods of this type are known as "frequency encoded spatial filtering."

For the foregoing reasons, there is a need for a computationally efficient nonlinear correction method that is capable of significantly improving the quality of solutions to a system of linear equations such as reconstructed images of a scattering medium.

SUMMARY OF THE INVENTION

The present invention satisfies this need by providing a method and system for image reconstruction and image correction that is computationally efficient and improves the quality of reconstructed images of a scattering medium.

In one embodiment of the system and method of the present invention, reconstructed images of a scattering medium are enhanced by: (1) subdividing a target medium into a plurality of volume elements and assigning a modulation frequency to at least one of the volume elements' optical coefficients; (2) directing energy into the target medium from at least one source during a period of time, and measuring energy emerging from the target medium through at least one detector; and (3) processing the measured energy emerging from the target medium to reconstruct at least one image, determining a frequency encoded spatial filter (FESF), and applying the FESF to at least one reconstructed image.

In another embodiment of the system and method of the present invention, a solution to a system of linear equations is enhanced by: (1) modeling a target medium into a plurality of elements and imposing at least one localized fluctuation into the target medium; (2) measuring an output resulting from at least one localized fluctuation; and (3) processing the measured output to reconstruct a result, determining a correction filter, and applying the correction filter to the result.

The above advantages and features are of representative embodiments only, and are presented only to assist in understanding the invention. It should be understood that they are not to be considered limitations on the invention as defined by the claims, or limitations on equivalents to the claims. For instance, some of these advantages may seem mutually contradictory, in that they cannot be simultaneously implemented in a single embodiment Similarly, some advantages are primarily applicable to one aspect of the invention. Thus, this summary of features and advantages should not be considered dispositive in determining equivalence. Additional features and advantages of the invention will become apparent in the following description, from the drawings, and from the claims.

BRIEF DESCRIPTION OF THE DRAWINGS

For a better understanding of the invention, together with the various features and advantages thereof, reference should be made to the following detailed description of the preferred embodiments and to the accompanying drawings therein.

DETAILED DESCRIPTION

1. Introduction

The system and method of the present invention will be discussed in accordance with its application to the field of optical tomography. It is noted, however, that this methodology applies to a broad range of problems dealing with linear applications in which linear perturbation theory is applied to foster a solution such as economics, quality-control, epidemiology, meteorology, or the like.

Image reconstruction methods employ computation-intensive algorithms, which are modifications of a standard linear perturbation approach to image recovery. One of the factors that has made the development of these algorithms difficult in the past has been the absence of a way to quantitatively characterize the information spread function (ISF) associated with a given image reconstruction method. The term ISF used herein refers to the precise manner in which the optical coefficients that actually are present in a given location of a target medium are mapped into the spatial domain of the image.

In the absence of information regarding the ISF, there is no apparent way of systematizing the process of modifying a reconstruction algorithm in response to the observed quality of its performance. In order to characterize the ISF for a given combination of reconstruction algorithm and reference medium the present invention utilizes the techniques found in magnetic resonance imaging (MRI), which encode a frequency response into measurement data that has a known spatial relationship with a target medium. Where the present invention differs from MRI is that rather than directly applying this strategy for image formation, the present invention instead applies this concept to derive a frequency encoded spatial filter (FESF) that is then applied to improve the spatial convolution of images previously recorded using other methods.

This is accomplished by recognizing that FESFs can be derived by examination of the position-dependent temporal frequency spectra obtained from a time series of images whose optical properties in each element were assigned different time-varying properties. In the case of a perfect imaging method, analysis of the time series would exactly recover the temporal behavior in every pixel. In practice, spatial convolution is present, in which case the location and amplitude of the convolving contrast feature can be determined from examination of the frequency spectrum of the pixel data. However, by assigning temporal properties that are uniquely distinguishable among all pixels, precise assignment of image contrast from any one pixel to any other is possible. The resulting information is then used as a linear operator that serves to rearrange (i.e., deconvolve) the contrast features of a recovered image from a test medium, thereby improving image quality. Implicit in this scheme is the assumption that the spatial convolution defined by the FESF is similar to the convolution present in the image of the test medium. In principle, any number of FESFs can be derived and applied as needed.

For illustration purposes, the present system and method is described in further detail below with respect to an optical tomography system used to generate images of a target scattering medium. However, it will be appreciated by those skilled in the art that the methodology of the present invention is applicable in image reconstruction from measured data based on any energy source (e.g., electromagnetic, acoustic, etc.), any scattering medium (e.g., body tissues, oceans, foggy atmospheres, geological strata, and various materials, etc.), any source condition (e.g., time-independent, time-harmonic, time-resolved) and any physical imaging domain (e.g., cross-sectional, volumetric). Accordingly, this methodology can be extended to allow for new imaging approaches in a broad range of applications, including nondestructive testing, geophysical imaging, medical imaging, and surveillance technologies.

2. Optical Tomography System

Figure 1:
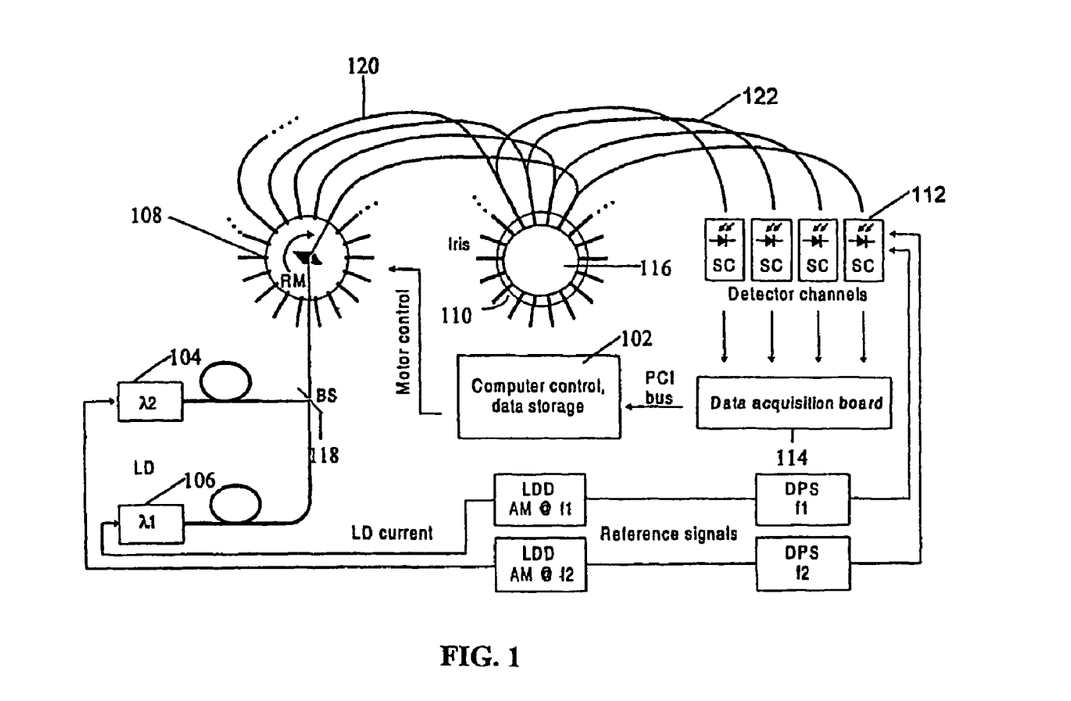
FIG. 1 is a schematic of an optical tomography system used in accordance with the present invention.

There are many known imaging systems for collecting the measured data used in image reconstruction in scattering media. A schematic illustration of an optical tomography system is shown in FIG. 1. This system includes a computer 102, energy sources 104 and 106, a fiber switcher 108, an imaging head 110, detectors 112, a data acquisition board 114, source fibers 120 and detector fibers 122.

The energy sources 104 and 106 provide optical energy, directed through a beam splitter 118, to the fiber switcher 108 and then to each of the plurality of source fibers 120 one at a time in series. The source fibers 120 are arranged around an imaging head 110 so that the energy is directed into the target medium 116 at a plurality of source locations around the target.

The energy leaves the source fiber 120 at the imaging head 110 and enters the target medium 116 centered in the imaging head 110. The energy is scattered as it propagates through the target medium, emerging from the target medium at a plurality of locations. The emerging energy is collected by the detector fibers 122 arranged around the imaging head 110. The detected energy then travels through the detector fibers 122 to detectors 112 having energy measuring devices that generate a signal corresponding to the measurement. The data acquisition board 114 receives the measurement signal for delivery to the computer 102.

This process is repeated for each source position so that a vector of measures are obtained for all of the detectors and source locations. The computer 102 or other suitable processing device or hardware is used to process the collected data and reconstruct the image as described in detail by the methods below.

3. Method

Figure 2:
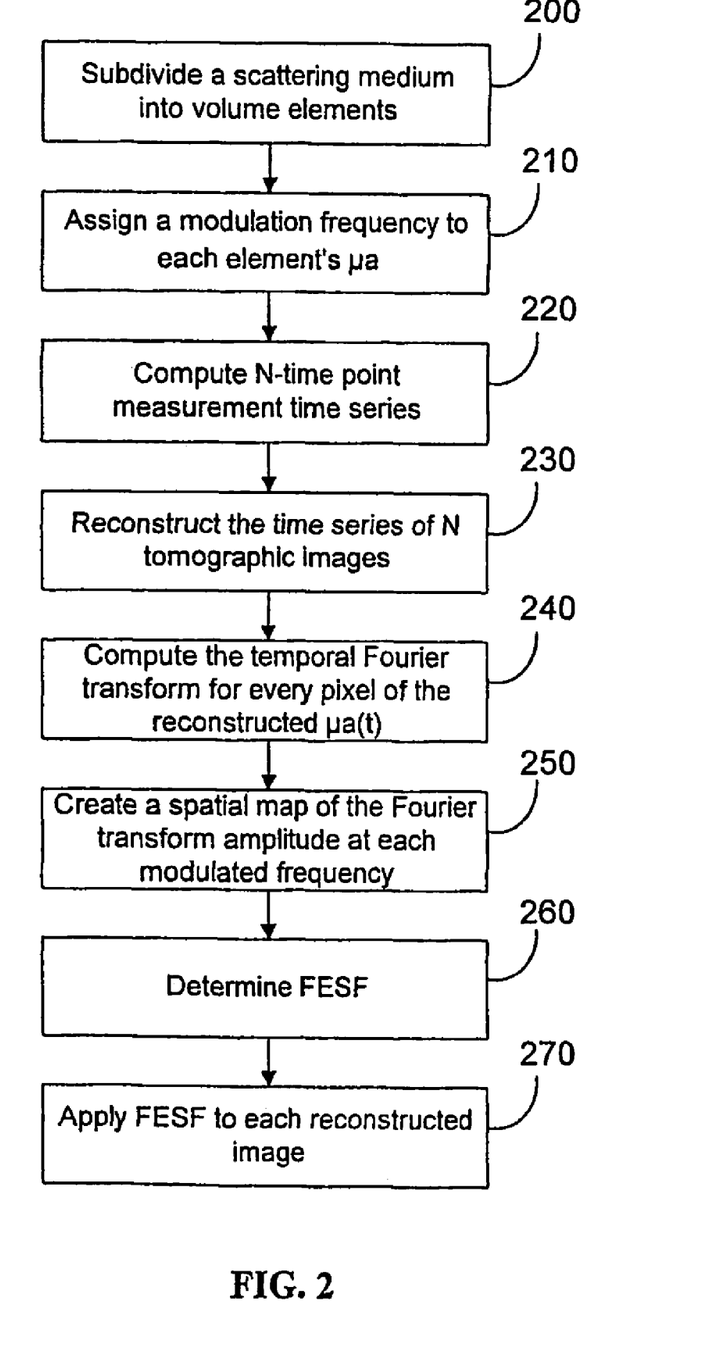
FIG. 2 is an illustrative flowchart describing the method of the present invention.

FIG. 2 is an illustrative flow chart describing the method of the present invention. The first step in accordance with the present invention is to subdivide a scattering medium for which the filter function will be computed into N small area or volume elements (step 200). Next, a sinusoidal temporal variation is assigned to an optical parameter (e.g., absorption and/or scattering coefficients) in each area/volume element, with a different frequency to each location ($f_1, f_2, \ldots, f_N$) (step 210). The oscillation frequencies (i.e., modulation frequency) in step 210 are chosen in such a way that every ratio of frequencies $f_m/f_n$, n m, is an irrational number.

The subsequent step involves computing a time series of forward problem solutions: $I(j,t_k)$, where $j=1, 2, \ldots, J$ is the detector index and $k=1, 2, \ldots, K$ is the time-step index for the resulting dynamic medium with $N>2\max(f_m)/\min(\Delta f_m)$ (step 220). In order to prevent frequency aliasing in step 220, the time interval between successive states of the medium must be small relative to the reciprocal of the highest frequency in the medium. Further, to ensure that there will be sufficiently high frequency resolution in the computed time series, the total duration of the measurement must be long relative to the reciprocal of the smallest difference between any two assigned frequencies. The data obtained in step 220 constitute a J×K matrix of detector readings.

The next step involves solving K inverse problems (i.e., reconstructing the time series of tomographic images), one for each set of detector readings computed in step 220 (step 230). In step 230, each column of the J×K matrix of detector readings, in turn, is used to generate the left-hand side of the equation $\delta I = W \delta x$, and the corresponding x is calculated. The data obtained in this step constitute an N×K matrix of reconstructed optical parameters—the n $n^{th}$ row is the time series for the optical parameter in the $n^{th}$ pixel or voxel.

Once the image time series is complete, the temporal discrete Fourier transform (DFT) for each pixel of the tomographic images is computed (step 240). Subsequently, a spatial map of the DFT amplitude at each modulated frequency is created (step 250). The FESF is determined by concatenating the DFTs computed in step 240 into an array or matrix, wherein each row corresponds to the DFT amplitude in one image pixel and each column corresponds to the DFT amplitude in one image pixel and each column corresponds to the spatial map of the amplitude at a particular frequency (step 260). The result, in step 260, is a single linear system, e.g., $\mu_a^* = F\mu_a$, where $\mu_a$ and $\mu_a$ are the N×1 vectors of reconstructed and true absorption coefficients, respectively, and F is an N×N matrix that is determined, as described subsequently, by comparing the matrix of DFT amplitudes computed from the image time series to the known ideal DFT amplitude matrix. Determination of $\mu_a^* = F\mu_a$, i.e., FESF, is accomplished via a straightforward LU decomposition (i.e., Gaussian elimination). It is noted that a singular-value decomposition (SVD) may also be used. Application of the FESF to each reconstructed image of the time series is a matter of performing a simple back-substitution (i.e., a spatial deconvolution correction to the reconstructed images) (step 270).

3.1 Forward Model

The following discussion regarding the Forward Model (i.e., the forward problem) is provided to elucidate the first step of reconstruction, which is used to predict what the detector readings would be for a particular source location based on the known internal properties of a reference medium.

As discussed above, typical reconstruction techniques are based on perturbation methods that essentially relate the difference between predicted detector measurements from a reference medium and detector measures from the target, to solve for the difference between unknown properties of the target and known properties of the reference. Accordingly, one of the first steps in reconstruction is to select a reference medium and predict the detector readings by modeling or physical measure. Modeling the energy propagation in the scattering medium is done using the transport equation or its approximation, the diffusion equation. The equations describe the propagation of photons through a scattering medium. For a domain having a boundary $\partial \Lambda$, this is represented by the expression:

$$\nabla \cdot [D(r)\nabla u(r)] - \mu_a(r)u(r) = -\delta(r-r_s), \quad r \in \Lambda, \qquad (1)$$

where $u(r)$ is the photon intensity at position r, $r_s$ is the position of a DC point source, and $D(r)$ and $\mu_a(r)$ are the position-dependent diffusion and absorption coefficients, respectively. Here the diffusion coefficient is defined as $D(r) = 1/\{3[\mu_a(r) + \mu_s(r)]\}$, where $\mu_s(r)$ is the reduced scattering coefficient. Using this equation, the energy emerging from the reference medium at each detector location for each source location is predicted. The transport or diffusion equations are also the basis for formulating the perturbation or inverse formulation used in reconstruction.

3.2 The Inverse Formulation

The following discussion regarding the Inverse Formulation (i.e., the inverse problem), is provided to elucidate the second step of reconstructing the time series of tomographic images.

As discussed above, reconstruction of a cross-sectional image of the absorption and/or scattering properties of the target medium is based on the solution of a perturbation or inverse formulation of the radiation transport or diffusion equation. The perturbation method assumes that the composition of the unknown target medium deviates only by a small amount from a known reference medium. This reduces a highly non-linear problem to one that is linear with respect to the difference in absorption and scattering properties between the target medium under investigation and the reference medium. The resulting optical inverse or perturbation formulation is based on the normalized difference method and has the following form:

$$W_r^{(\mu_a)} \cdot \delta\mu_a + W_r^{(D)} \cdot \delta D = \delta\mu_r, \quad (2)$$

where $\delta\mu_a$ and $\delta D$ are the vectors of cross-sectional differences between the optical properties (absorption and diffusion coefficients, respectively) of a target (measured) medium and of a reference (computed or measured) medium used to generate the initial guess; $W_r^{(\mu_a)}$ and $W_r^{(D)}$ are the weight matrices describing the influence that localized perturbations in the absorption and diffusion coefficients, respectively, of the selected reference medium have on the surface detectors; and $\mu_r$ represents a normalized difference between two sets of detector readings, which is defined by the equation:

$$(\delta u_r)_i = \left(\frac{(u_1)_i - (u_2)_i}{(u_2)_i}\right)(u_r)_i, \quad i = 1, 2, \ldots, M. \quad (3)$$

Here, $u_r$ is the computed detector readings corresponding to the selected reference medium, $u_2$ and $u_1$ represent two sets of measured data (e.g., background vs. target, time-averaged mean vs. a specific time point, etc.) and M is the number of source-detector pairs in the set of measurements.

3.3 Weight Matrix Scaling

The following discussion regarding Weight Matrix Scaling is provided to elucidate the scaling of the weight matrices arrived at in the inverse problem.

The effect of scaling the weight matrix is to make it more uniform, which can often serve to improve its conditioning. A scaling approach that scales each column of $W_r^{(\mu_a)}$ and $W_r^{(D)}$ to the average value of the column vector is used. However, it should be understood that any of the known scaling approaches could be adopted. The form of the resulting new weight matrices is:

$$\tilde{W}_r^{(k)} = W_r^{(k)} \cdot R^{(k)}, \quad (4)$$

where k can be $\mu_a$ or D, and $R^{(k)}$ is the normalizing matrix whose entries are:

$$(R^{(k)})_{ij} = \begin{cases} \dfrac{1}{\dfrac{1}{M}\sum_{m=1}^{M}\left(W_r^{(k)}\right)_{mj}} & j = i, \\ 0 & j \neq i, \end{cases} \quad i, j = 1, 2, \ldots, N, \quad (5)$$

in which N is the number of elements used in discretizing the domain $\Lambda$. The resulting system equation is:

$$\tilde{W}_r^{(\mu_a)} \cdot \delta\tilde{\mu}_a \tilde{W}_r^{(D)} \cdot \delta\tilde{D} = \delta\mu_r, \quad (6)$$

where $\delta\tilde{\mu}_a = [R^{(\mu_a)}]^{-1} \cdot \delta\mu_a$ and $\delta\tilde{D} = [R^{(D)}]^{31\ 1} \cdot \delta D$. Note that $R^{(k)}$ is a diagonal matrix (Eq. 5) all of whom main diagonal elements are non-zero (Eq. 5); consequently it has a well-defined inverse, the computation of which is a trivial matter.

4. Frequency Encoded Spatial Filter (FESF)

The following discussion regarding FESF is provided to elucidate determination of the FESF, which is used to reconstruct corrected images.

The amplitude "spatial maps" produced by image reconstruction and the computations of the DFTs in actuality are strings of numbers, each being the amplitude, at one particular frequency, assigned by the reconstruction algorithm to one of the FEM nodes (i.e., the number or vertices, or points where three or more elements come together). The entire set of amplitude maps can be concatenated into a matrix:

$$A_i = \begin{bmatrix} A_{11} & A_{12} & \ldots & A_{1N_n} \\ A_{21} & A_{22} & \ldots & A_{2N_n} \\ \vdots & \vdots & \ddots & \vdots \\ A_{N_f 1} & A_{N_f 2} & \ldots & A_{N_f N_n} \end{bmatrix},$$

where $N_f$ is the number of frequencies (=number of finite elements) and $N_n$ is the number of FEM nodes. This is important in understanding the determination of the FESF, because in practice the number of nodes invariably is smaller than the number of elements. Then $A_i$ (i for "mages") is not a square matrix, but has approximately half as many rows as columns.

As such, a second matrix can be written, which tells us exactly where each modulation frequency actually was present in the medium:

$$B_m = \begin{bmatrix} B_{11} & B_{12} & \ldots & B_{1N_n} \\ B_{21} & B_{22} & \ldots & B_{2N_n} \\ \vdots & \vdots & \ddots & \vdots \\ B_{N_f 1} & B_{N_f 2} & \ldots & B_{N_f N_n} \end{bmatrix}.$$

The matrix $B_m$ must be sparse (i.e., most of its elements are zeroes), because each $f_m$ is assigned to only one of the medium's finite elements. In fact, every row of $B_m$, which contains hundreds or thousands of elements altogether (i.e., $N_n = 10^3 – 10^4$), has exactly three (in the case of two-dimensional media) or four (three-dimensional media) elements that are not zero. The number is three or four due to the use of triangular or tetrahedral elements, so each element is bounded by three or four nodes.

If the previously described reconstruction process were perfect, $A_i = B_m$. This ideal result, however, is not achieved in practice. Thus one must make some type of assumption regarding the nature of the function that transforms $A_i$ into $B_m$. The one made in the present invention is that the frequency spectrum present at any one node (i.e., pixel) in the images is a linear function of the frequencies present at all nodes in the medium. Mathematically, this is stated by: $TA_i = B_m$, where T is a $N_n \times N_n$ (i.e., square) matrix. In practice, one wants the transformation to go in the other direction, that is, starting from $B_m$, produce something that is as close as possible to the true $A_i$. Thus, computation of the filter that will actually be used in practice is accomplished by solving the matrix equation $A_i = FB_m$, where F also is a $N_n \times N_n$ matrix. T and F are inverses of each other.

It is noted that the total number of elements in F is smaller than the number in $B_m$, because $N_n < N_f$. This means that perfect correction will not occur when applying this method, because there aren't enough correction terms to go around. This occurs, not because of the assumed linear relation between $A_i$ and $B_m$, but because there is an unavoidable loss of information associated with mapping the frequencies in $N_f$ elements into the smaller number, $N_n$, of nodes.

The FESF that is computed in this way has quality-control utility as a way of quantifying the accuracy of reconstruction algorithms. The FESF may further be used as an image enhancing tool if it is employed in conjunction with data obtained from different experimental media from the one used to generate the filter. In this scenario, upon reconstruction of a set of images $I_1$, $I_2$, etc., then, to the extent that the filter function is not strongly dependent on the medium's properties, the spatial accuracy of the reconstruction can be improved by computing $FI_1$, $FI_2$, etc.

5. Demonstration Results

The following example is presented to illustrate features and characteristics of the present invention, and is provided solely to assist in explanation of a demonstration of the invention and is not intended to be construed as limited thereto.

A demonstration of the utility of the FESF is described in the foregoing example. As discussed below the FESF has been applied to two different image time series, both obtained from the same sets of detector readings but employing different varieties of a reconstruction algorithm. In principle the reconstruction methods employed should produce identical results since there is no self-evident a priori reason for choosing to use one rather than the other. However, application of the FESF method indicates that one variety of reconstruction methods can produce spatially accurate images of perturbations at any location of the modeled medium, and the other can not do so. Accordingly, the computed ISF for either algorithm affords a way of applying a spatial deconvolution correction to a reconstructed image.

Figure 3:
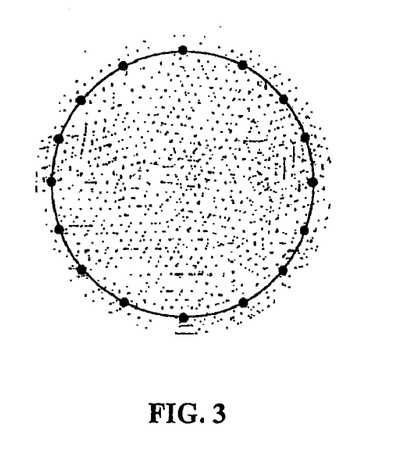
FIG. 3 illustrates a target medium.
Figure 4A:
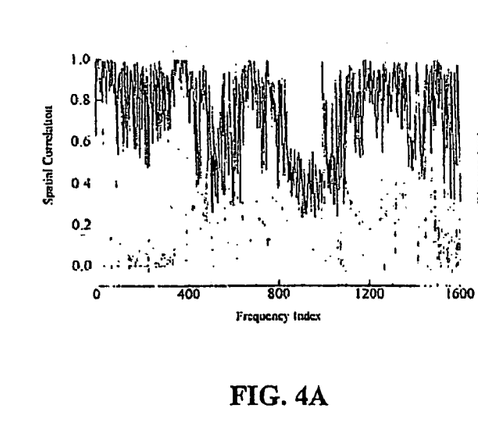
FIG. 4A illustrates the global spatial correlation between each amplitude map and the known spatial distribution of the corresponding frequency in the target medium, plotted as a function of the modulation frequency ($f_m$) for the weight-transform singular-value decomposition (SVDWT) algorithm.
Figure 4B:
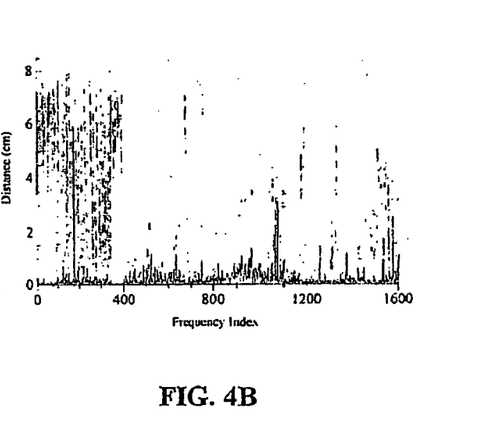
FIG. 4B illustrates each amplitude map's center of mass plotted as a function of $f_m$ for the SVDWT algorithm.
Figure 5A:
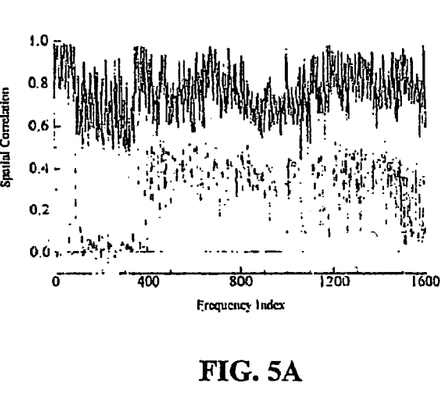
FIG. 5A illustrates the global spatial correlation between each amplitude map and the known spatial distribution of the corresponding frequency in the target medium plotted as a function of $f_m$ for the combined SVDWT with an additional matrix preconditioning operation (SVDWTRS) algorithm.
Figure 5B:
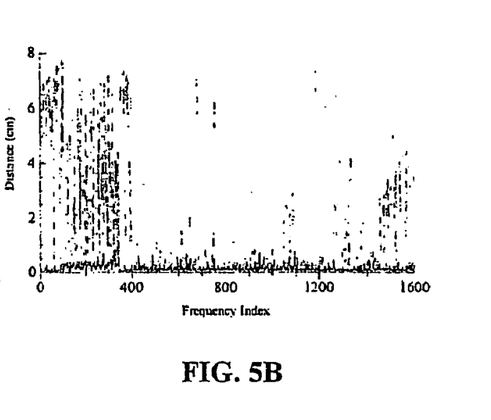
FIG. 5B illustrates each amplitude map's center of mass plotted as a function of $f_m$ for the SVDWTRS algorithm.

FIG. 3 illustrates a regularly-shaped two-dimensional medium (i.e., the target medium). As shown in FIG. 3, the medium is a homogeneous disk of 8 cm diameter, with optical coefficient values of $_a$=0.06 cm$^{-1}$, $_s$=Dcm$^{-1}$. For more convenient solution of the forward and inverse problems, the mathematical boundary of the disk was extended 0.5 cm beyond that of the "physical" medium, as indicated in FIG. 3. The coefficient values in the extended region were the same as those of the "physical" medium. Sixteen equally spaced, unit-strength, homogeneous point sources were placed in the medium at the indicated positions on the physical boundary.

The numbers of finite elements and nodes in the indicated mesh are 1604 and 850, respectively, and the smallest and largest element areas are 0.026 cm$^2$ and 0.073 cm$^2$ (mean±standard deviation=0.040±0.006 cm$^2$). Sinusoidal modulation was imposed on the absorption coefficient in each element. A unique $f_m$ was assigned to each, while the amplitude was everywhere 0.006 cm$^{-1}$ (i.e., 10% of the mean value). For this preliminary study, the elements' scattering coefficients were not modulated in time.

To ensure that the resolution bandwidth was smaller than the smallest difference between $f_m$s and the Nyquist frequency was greater than the largest $f_m$, a time series of ten thousand sets of tomographic detector readings was computed, with t=0.01 s. Image reconstruction was carried out with two algorithms, both based on an SVD of the image operator matrix. The first algorithm used was the previously described weight-transform SVDWT method. The second reconstruction method—SVDWTWRS—combined SVDWT with an additional matrix preconditioning operation, in which each equation was scaled so that all rows of the weight matrix had the same sum.

Two types of analysis were performed on the 1,604 DFT amplitude maps produced during image reconstruction. First, the global spatial correlation was computed between each amplitude map and the known spatial distribution of the corresponding frequency in the target medium (ideal result: correlation exactly equal to 1.0 at all frequencies). Second, the coordinates of each map's center-of-mass were computed, from which we easily determined its displacement from the geometric centroid of the finite element whose $_a$ was modulated at the corresponding frequency (ideal result: displacement exactly equal to 0.0 at all frequencies). These two quantities are plotted, as a function of $f_m$ (or, equivalently, location in the target medium), for the SVDWT algorithm in FIGS. 4A and 4B, and for the SVDWTWRS algorithm in FIGS. 5A and 5B. The lighter-colored curve in FIGS. 4A and 4B, and 5A and 5B are derived from the unfiltered FT amplitude spatial distributions. The darker curves are the results obtained when the calculations were repeated after we made the best-possible correction consistent with the theoretical model described above, according to which the amplitude maps derived from the reconstructed images are a simple linear transformation of the true spatial distributions present in the target medium.

Inspection of FIGS. 4A and 4B, and 5A and 5B reveals that each plotted function exhibits a qualitative change in behavior after the 400$^{th}$ $f_m$. The change is simply a consequence of the fact that the first 400 finite elements all were located in the zone (see FIG. 3) lying between the physical and extended boundaries, i.e., outside the ring of sources and detectors. Closer inspection of FIGS. 4A and 4B reveals that both spatial accuracy measures fall particularly far from their ideal values for those finite elements corresponding to roughly the 800$^{th}$ through 1100$^{th}$ $f_m$. These elements are the ones that lay in the central region of the target medium. That is, the SVDWT algorithm reconstructed images that were strongly distorted spatially, with the absorption coefficient values of the central region significantly displaced toward the surface while those of the more peripheral region were recovered with considerably greater accuracy. In contrast, the spatial correlation and centroid displacement are considerably more spatially uniform for the amplitude maps derived from the images reconstructed by the (preconditioned) SVDWTWRS algorithm. This is a significant observation, as the two reconstruction variants theoretically should yield the same solution when both operate on a given set of detector data. Finally, it is seen that in each panel of FIGS. 4A and 4B, 5A and 5B, most points on the dark (corrected images) curve lie closer to the ideal value than those on the light (uncorrected mages) curve. This demonstrates the possibility that information in the ISF could be used to perform post-reconstruction enhancement of the images' spatial accuracy.

It should be understood that the above description is only representative of illustrative embodiments. For the convenience of the reader, the above description has focused on a representative sample of possible embodiments, a sample that is illustrative of the principles of the present invention. The description has not attempted to exhaustively enumerate all possible variations. That alternate embodiments may not have been presented for a specific portion of the invention, or that further undescribed alternate embodiments may be available for a portion, is not to be considered a disclaimer of those alternate embodiments. Other applications and embodiments can be conceived by those without departing from the spirit and scope of the present invention. It is therefore intended, that the invention is not to be limited to the disclosed embodiments but is to be defined in accordance with the claims that follow. It can be appreciated that many of those undescribed embodiments are within the scope of the following claims, and others are equivalent.

What is claimed is:

1. A method of enhancing reconstructed images of a scattering medium, comprising: subdividing a first target medium into a plurality of volume elements; assigning a modulation frequency to at least one of the volume elements' optical coefficients; directing energy into the first target medium from at least one source during a period of time; measuring energy emerging from the first target medium through at least one detector; processing the measured energy emerging from the first target medium to reconstruct at least one image; determining a frequency encoded spatial filter (FESF); and applying the FESF to at least one reconstructed image of the first target medium.

2. The method according to claim 1, wherein the modulation frequency is assigned to an absorption coefficient of a volume element.

3. The method according to claim 1, wherein the modulation frequency is assigned to a scattering coefficient of a volume element.

4. The method according to claim 1, wherein the measured energy emerging from the first target medium is processed by employing a perturbation method.

5. The method according to claim 4, wherein the perturbation method employed uses a forward problem solution to reconstruct the tomographic images.

6. The method according to claim 4, wherein the perturbation method employed uses the inverse problem to reconstruct the tomographic images.

7. The method according to claim 1, wherein determining the FESF, comprises: computing the temporal discrete Fourier transform of the reconstructed tomographic images; and processing the computed temporal discrete Fourier transform to determine the amplitude at a modulation frequency associated with its corresponding volume element.

8. The method according to claim 1, wherein the FESF is applied to at least one reconstructed image by performing a simple matrix multiplication.

9. The method according to claim 1, further comprising directing energy into a second target medium from at least one source during a period of time; measuring energy emerging from the second target medium through at least one detector; processing the measured energy emerging from the second target medium to reconstruct at least one image; and applying the FESF determined from the first target medium to at least one reconstructed image of the second target medium.

10. A system for enhancing reconstructed images of a scattering medium, comprising: means for subdividing a first target medium into a plurality of volume elements;
means for assigning a modulation frequency to at least one of the volume elements' optical coefficients; means for directing energy into the first target medium from at least one source during a period of time; means for measuring energy emerging from the first target medium through at least one detector, means for processing the measured energy emerging from the first target medium to reconstruct at least one image; means for determining an FESF; and means for applying the FESF to at least one reconstructed image of the first target medium.

11. The system according to claim 10, wherein the modulation frequency is assigned to an absorption coefficient of a volume element.

12. The system according to claim 10, wherein the modulation frequency is assigned to a scattering coefficient of a volume element.

13. The system according to claim 10, wherein the measured energy emerging from the first target medium is processed by employing a perturbation method.

14. The system according to claim 13, wherein the perturbation method employed uses a forward problem solution to reconstruct the tomographic images.

15. The system according to claim 13, wherein the perturbation method employed uses the inverse problem to reconstruct the tomographic images.

16. The system according to claim 10, wherein determining the FESF, comprises: means for computing the temporal discrete Fourier transform of the reconstructed tomographic images; and means for processing the computed temporal discrete Fourier transform to determine the amplitude at a modulation frequency associated with its corresponding volume element.

17. The system according to claim 10, wherein the FESF is applied to at least one reconstructed image by performing a simple matrix multiplication.

18. The system according to claim 10, further comprising:
means for directing energy into a second target medium from at least one source during a period of time; means for measuring energy emerging from the second target medium through at least one detector; means for processing the measured energy emerging from the second target medium to reconstruct at least one image; and means for applying the FESF determined from the first target medium to at least one reconstructed image of the second target medium.

19. A program stored on a computer readable medium and executable by a processor, comprising: instruction code which, when executed by the processor subdivides a first target medium into a plurality of volume elements; instruction code which, when executed by the processor assigns a modulation frequency to at least one of the volume elements' optical coefficients; instruction code which, when executed by the processor directs energy into the first target medium from at least one source during a period of time; instruction code which, when executed by the processor measures energy emerging from the first target medium through at least one detector, instruction code which, when executed by the processor processes the measured energy emerging from the first target medium to reconstruct at least one image;
instruction code which, when executed by the processor determines an FESF; and instruction code which, when executed by the processor applies the FESF to at least one reconstructed image of the first target medium.

20. A program, according to claim 19, further comprising: instruction code which, when executed by the processor directs energy into a second target medium from at least one source during a period of time; instruction code which, when executed by the processor measures energy emerging from the second target medium through at least one detector;
instruction code which, when executed by the processor processes the measured energy emerging from the second target medium to reconstruct at least one image; and instruction code which, when executed by the processor applies the FESF determined from the first target medium to at least one reconstructed image of the second target medium.

* * * * *